US011598239B2

United States Patent
Henrichsen et al.

(10) Patent No.: US 11,598,239 B2
(45) Date of Patent: Mar. 7, 2023

(54) CROSSFLOW PNA-SCR AFTERTREATMENT DEVICE

(71) Applicant: CUMMINS INC., Columbus, IN (US)

(72) Inventors: Lars Krister Henrichsen, Columbus, IN (US); Krishna P. Chilumukuru, Columbus, IN (US); Michael Haas, Columbus, IN (US); Matthew L. Anderson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/707,312

(22) Filed: Mar. 29, 2022

(65) Prior Publication Data

US 2022/0220878 A1 Jul. 14, 2022

Related U.S. Application Data

(62) Division of application No. 16/497,438, filed as application No. PCT/US2018/024481 on Mar. 27, 2018, now Pat. No. 11,333,054.

(Continued)

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9431* (2013.01); *F01N 3/022* (2013.01);
(Continued)

(58) Field of Classification Search
CPC ...... F01N 3/2066; F01N 3/022; F01N 3/0814; F01N 3/0842; F01N 3/2803;
(Continued)

(56) References Cited

U.S. PATENT DOCUMENTS 3,860,535 A   1/1975   Johnson
3,929,418 A   12/1975  Wood
(Continued)

FOREIGN PATENT DOCUMENTS

EP   0 801 707 A1   10/1997

OTHER PUBLICATIONS

International Search Report and Written Opinion from corresponding PCT Application No. PCT/US2018/024481, dated Jun. 11, 2018, pp. 1-10.

(Continued)

*Primary Examiner* — Brandon D Lee
(74) *Attorney, Agent, or Firm* — Foley & Lardner LLP (57) ABSTRACT

An exhaust aftertreatment system includes a cross-flow selective catalytic reduction catalyst. The cross-flow selective catalytic reduction catalyst includes a housing and a substrate assembly. The substrate assembly includes a plurality of first substrate layers defining a plurality of first flow channels and a plurality of second substrate layers defining a plurality of second flow channels. The exhaust aftertreatment system includes a passive $NO_x$ adsorber. The passive $NO_x$ adsorber includes a housing. The housing includes an inlet in exhaust gas receiving communication with the plurality of first flow channels of the cross-flow selective catalytic reduction catalyst. The housing includes an outlet in exhaust gas providing communication with the plurality of second flow channels of the cross-flow selective catalytic reduction catalyst. The passive $NO_x$ adsorber includes a substrate positioned in the housing. The substrate includes a passive $NO_x$ adsorber washcoat.

15 Claims, 6 Drawing Sheets

Related U.S. Application Data (60) Provisional application No. 62/479,686, filed on Mar. 31, 2017.

(51) Int. Cl.
*F01N 3/022* (2006.01)
*F01N 3/08* (2006.01)
*F01N 3/28* (2006.01)
*F01N 13/00* (2010.01)

(52) U.S. Cl.
CPC ......... *F01N 3/0814* (2013.01); *F01N 3/0842* (2013.01); *F01N 3/2803* (2013.01); *F01N 3/2892* (2013.01); *B01D 2255/902* (2013.01); *B01D 2255/91* (2013.01); *F01N 3/0821* (2013.01); *F01N 3/2882* (2013.01); *F01N 13/009* (2014.06); *F01N 2610/1453* (2013.01)

(58) Field of Classification Search
CPC .... F01N 3/2892; F01N 3/0821; F01N 3/2882; F01N 13/009; F01N 2610/1453; F01N 13/0097; F01N 2250/12; F01N 2370/02; F01N 2610/02; F01N 3/281; B01D 53/9431; B01D 2255/902; B01D 2255/91; B01D 53/9477; Y02T 10/12

See application file for complete search history.

(56) References Cited

U.S. PATENT DOCUMENTS

| | | | |
|---|---|---|---|
| 5,303,547 A | 4/1994 | Mieville et al. | |
| 5,609,832 A | 3/1997 | Mieville et al. | |
| 6,171,556 B1* | 1/2001 | Burk ................... | F01N 3/0807 422/177 |
| 7,438,865 B2 | 10/2008 | Collins et al. | |
| 2004/0254073 A1 | 12/2004 | Wei et al. | |
| 2007/0128088 A1 | 6/2007 | Willey et al. | |
| 2015/0202611 A1 | 7/2015 | Chiffey et al. | |
| 2015/0247437 A1 | 9/2015 | Ancimer et al. | |
| 2016/0341091 A1 | 11/2016 | Theis et al. | |

OTHER PUBLICATIONS

Non-Final Office Action for U.S. Appl. No. 16/497,438, dated Oct. 4, 2021.

U.S. Notice of Allowance for U.S. Appl. No. 16/497,438, dated Jan. 19, 2022.

* cited by examiner

CROSSFLOW PNA-SCR AFTERTREATMENT DEVICE

CROSS-REFERENCE TO RELATED PATENT APPLICATIONS

This application is a divisional of U.S. patent application Ser. No. 16/497,438, filed Sep. 24, 2019, which is the U.S. National Stage of PCT Application No. PCT/US2018/024481, filed Mar. 27, 2018, which claims the benefit of and priority to U.S. Provisional Patent Application No. 62/479,686, filed Mar. 31, 2017, the contents of which are incorporated herein by reference in their entirety.

TECHNICAL FIELD

The present disclosure relates generally to the field of exhaust aftertreatment systems.

BACKGROUND

In general, regulated emissions for internal combustion ("IC") engines include carbon monoxide ("CO"), hydrocarbons ("HC"), nitrogen oxides ("$NO_x$"), and particulates. However, such regulations have become more stringent over recent years. For example, the regulated emissions of $NO_x$ and particulates from diesel-powered IC engines are low enough that, in many cases, the emissions levels cannot be met with improved combustion technologies alone. To that end, exhaust aftertreatment systems are increasingly utilized to reduce the levels of harmful exhaust emissions present in exhaust gas.

Conventional exhaust gas aftertreatment systems include any of several different components to reduce the levels of harmful exhaust emissions present in exhaust gas. For example, certain exhaust aftertreatment systems for diesel-powered IC engines include various components, such as a diesel oxidation catalyst ("DOC"), a selective catalytic reduction ("SCR") catalyst, a diesel particulate filter ("DPF"), an SCR on filter, a passive $NO_x$ adsorber ("PNA"), and/or an ammonia slip catalyst ("ASC") (also referred to as an ammonia oxidation catalyst ("AMOX")). Each of the DOC, SCR catalyst, DPF, SCR on filter, PNA, and/or the ASC components is configured to perform a particular exhaust emissions treatment operation on the exhaust gas passing through or over the respective components.

SUMMARY

Various embodiments relate to an exhaust aftertreatment device. An example exhaust aftertreatment device includes a housing defining an inlet and an outlet. A plurality of first substrate layers are positioned within the housing in fluid receiving communication with the inlet. The plurality of first substrate layers define a first flow direction, and the plurality of first substrate layers comprise a passive $NO_x$ adsorber washcoat. A plurality of second substrate layers are positioned within the housing with the first and second substrate layers being layered in alternating order. The plurality of second substrate layers define a second flow direction perpendicular to the first flow direction, and the plurality of second substrate layers comprise a selective catalytic reduction washcoat. A connecting passage is in fluid receiving communication with the plurality of first substrate layers and in fluid providing communication with the plurality of second substrate layers.

Various other embodiments relate to an exhaust aftertreatment device. An example exhaust aftertreatment device includes a housing that defines a first inlet, a first outlet, a second inlet, and a second outlet. A substrate assembly is positioned within the housing. The substrate assembly includes a plurality of first substrate layers in fluid communication with the first inlet and the first outlet. The plurality of first substrate layers include a passive $NO_x$ adsorber washcoat. The substrate assembly also includes a plurality of second substrate layers in fluid communication with the second inlet and the second outlet. The plurality of second substrate layers include a selective catalytic reduction washcoat. The plurality of second substrate layers are thermally coupled with the plurality of first substrate layers.

Various other embodiments relate to an exhaust aftertreatment system. An example exhaust aftertreatment system includes a cross-flow selective catalytic reduction catalyst, which includes a housing that defines a first inlet in exhaust gas receiving communication with an engine. A substrate assembly is positioned within the housing. The substrate assembly includes a plurality of first substrate layers. The plurality of first substrate layers define a plurality of first flow channels. The plurality of first substrate layers are uncoated. The substrate assembly also includes a plurality of second substrate layers. The plurality of second substrate layers define a plurality of second flow channels. The plurality of second substrate layers include a selective catalytic reduction washcoat. The exhaust aftertreatment system also includes a passive $NO_x$ adsorber. The passive $NO_x$ adsorber includes a housing, which includes an inlet in exhaust gas receiving communication with the plurality of first flow channels of the cross-flow selective catalytic reduction catalyst. The housing also includes an outlet in exhaust gas providing communication with the plurality of second flow channels of the cross-flow selective catalytic reduction catalyst. A substrate is positioned in the housing of the passive $NO_x$ adsorber. The substrate includes a passive $NO_x$ adsorber washcoat.

Various other embodiments relate to an exhaust aftertreatment system. An example exhaust aftertreatment system includes an exhaust aftertreatment device. The exhaust aftertreatment device includes a housing that defines a first inlet, a first outlet, a second inlet, and a second outlet. A substrate assembly is positioned within the housing. The substrate assembly includes a plurality of first substrate layers that are in fluid communication with the first inlet and the first outlet. The plurality of first substrate layers include an oxidation catalyst washcoat. A plurality of second substrate layers are in fluid communication with the second inlet and the second outlet. The plurality of second substrate layers include a selective catalytic reduction washcoat. The plurality of second substrate layers are thermally coupled with the plurality of first substrate layers.

Still other embodiments relate to an exhaust aftertreatment device. An example exhaust aftertreatment device includes a housing that defines a first inlet, a first outlet, a second inlet, and a second outlet. A substrate assembly is positioned within the housing. The substrate assembly includes a plurality of first substrate layers that are in fluid communication with the first inlet and the first outlet. The plurality of first substrate layers include an oxidation catalyst washcoat. A plurality of second substrate layers are in fluid communication with the second inlet and the second outlet. The plurality of second substrate layers include a particulate filter element. The plurality of second substrate layers are thermally coupled with the plurality of first substrate layers.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Current diesel engine system technology is capable of reducing $NO_x$ emissions to the 0.1-0.2 g/hp-hr range over the federal test procedure ("FTP") composite cycle. This is accomplished using combustion timing and exhaust gas recirculation ("EGR") to reduce engine-out $NO_x$ levels and using high efficiency aftertreatment processes, such as SCR, for further $NO_x$ reduction at the tailpipe. The integrated performance of the engine and aftertreatment system is essential to achieving effective $NO_x$ reduction. For example, SCR aftertreatment has its highest $NO_x$ conversion efficiencies at temperatures above 300° C., which can be enabled by various engine-side thermal management strategies. Engine-out $NO_x$ levels can also be lowered by adjusting EGR and timing levers, thereby reducing the amount of $NO_x$ that the aftertreatment system must remove. However, these strategies can incur system fuel economy penalties.

At low temperatures, there is little to no $NO_x$ conversion due to lower SCR conversion efficiencies and limitations on the ability to dose reductant (e.g., in the form of ammonia ("$NH_3$") from diesel exhaust fluid ("DEF") or urea) at temperatures below approximately 200° C. A cold start is one of the most challenging conditions to meeting emissions requirements because of thermal lag due to the thermal mass of the aftertreatment components, which need to be heated in order to reach functional catalyst temperatures. A typical heavy-duty on-highway aftertreatment system includes an oxidation catalyst, a particulate filter, an SCR catalyst, and an ASC located under the passenger side step of a vehicle. Therefore, to heat the SCR catalyst to a point where it is functional, the downpipe, filter assembly inlet, oxidation catalyst, particulate filter, filter assembly outlet, reductant decomposition chamber, and injected reductant all pull heat from the exhaust gas before it reaches the SCR catalyst. All of the thermal mass upstream of the SCR catalyst delays the heat-up of the SCR catalyst and delays the point where when DEF can be injected into the exhaust gas to reduce $NO_x$ emissions.

A PNA can help in reducing $NO_x$ emissions at low exhaust temperatures. A PNA stores $NO_x$ at low temperatures and then releases it at higher temperatures when the SCR catalyst is able to reduce the $NO_x$ to nitrogen. The PNA is typically positioned close to each of engine-out and the downstream SCR catalyst. In some embodiments, the PNA includes additional catalytic properties similar to those of an oxidation catalyst. For example, in some embodiments, the PNA is structured to oxidize unburnt hydrocarbons, $NO_x$, and other various exhaust constituents.

Because the exhaust gas is the source of warm-up energy for both the PNA and the SCR catalyst, one problem that arises is the thermal lag between the PNA warming up and the SCR catalyst warming up. In operation, a time lag exists between the time that the PNA has warmed up sufficiently to begin releasing $NO_x$ and the time that the downstream SCR catalyst has warmed up sufficiently to convert this initially released $NO_x$. This lag results from components between the PNA and the SCR catalyst, such as piping and a DPF. The thermal lag can be reduced by moving the PNA and the SCR catalyst closer together, such as by reducing DEF decomposition pipe length or by combining the DPF and the SCR catalyst into an SCR on filter; however, these measures do not completely eliminate temperature lag and accompanying $NO_x$ slip. Shifting the PNA $NO_x$ release to higher temperatures also helps but does not completely resolve the temperature lag.

Various embodiments relate to an exhaust aftertreatment device comprising a PNA and an SCR catalyst combined onto a single substrate assembly so that heat is transferred between both catalysts but the exhaust gas is still exposed first to the PNA and second to the SCR catalyst. In some embodiments, the PNA-SCR catalyst substrate construction has multiple flow directions that are interdigitated with each other to allow for heat flow between the two flow paths. In some embodiments, instead of using a traditional catalyst substrate that has all of the channels parallel to one axis of the substrate, the PNA-SCR catalyst has channels flowing in directions perpendicular to one another in an alternating layered structure so as to define alternating cross-flow flow paths.

In one example embodiment, a cross-flow PNA-SCR exhaust aftertreatment device includes a housing defining an inlet and an outlet. A plurality of first substrate layers are positioned within the housing in fluid receiving communication with the inlet. The plurality of first substrate layers define a first flow direction and comprise a PNA washcoat. A plurality of second substrate layers are also positioned within the housing with the first and second substrate layers being layered in alternating order. The plurality of second substrate layers define a second flow direction perpendicular to the first flow direction and comprise an SCR washcoat. The exhaust aftertreatment device also includes a connecting passage in fluid receiving communication with the plurality of first substrate layers and in fluid providing communication with the plurality of second substrate layers.

Figure 1:
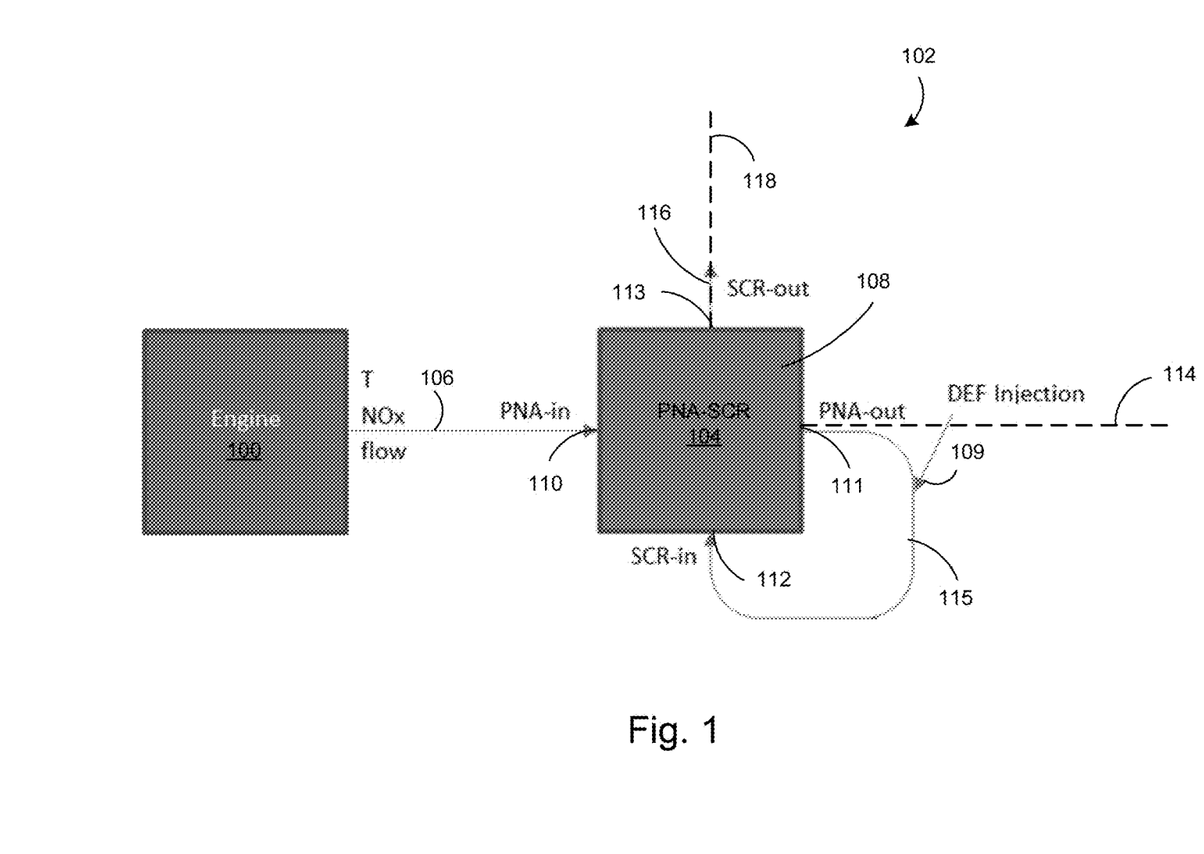
FIG. 1 is a block diagram illustrating an engine and an exhaust aftertreatment system fluidly coupled to the engine, according to an embodiment.

FIG. 1 is a block diagram illustrating an engine 100 and an exhaust aftertreatment system 102 fluidly coupled to an exhaust manifold (not shown) of the engine 100, according to an embodiment. The engine 100 can be a compression-ignited or a spark-ignited engine and can be powered by any of various fuels, such as diesel, natural gas, gasoline, etc. In one embodiment, the engine 100 is a diesel or a lean-burn gasoline engine. In operation, the engine 100 expels exhaust gas, which flows downstream from the engine 100 through the exhaust aftertreatment system 102. Generally, the exhaust aftertreatment system 102 is configured to remove various chemical and particulate emissions present in the exhaust gas.

The exhaust aftertreatment system 102 includes a PNA-SCR catalyst 104. The PNA-SCR catalyst 104 is a hybrid exhaust aftertreatment device that includes the functionality of a PNA and an SCR catalyst in a single component housing. The PNA-SCR catalyst 104 comprises a housing 108 that defines a first inlet 110, a first outlet 111, a second inlet 112, and a second outlet 113. As illustrated in FIG. 1, the PNA-SCR catalyst 104 is in fluid receiving (e.g., exhaust gas receiving) communication with the engine 100 via a first exhaust conduit 106 fluidly coupled to the first inlet 110. In some embodiments, the PNA-SCR catalyst 104 is positioned in close thermal proximity to (e.g., less than 3 feet from) the engine 100. Positioning the PNA-SCR catalyst 104, specifically the SCR portion of the PNA-SCR catalyst 104, in close thermal proximity to the turbine outlet (not shown) minimizes heat loss to the ambient environment. For example, in some embodiments, the PNA-SCR catalyst 104 is positioned so as to minimize the amount of thermal mass upstream of the SCR portion of the PNA-SCR catalyst 104, thereby improving SCR catalyst warmup.

The first exhaust conduit 106 defines a first exhaust flow axis 114. Exhaust gas flows from the engine 100 to the PNA-SCR catalyst 104 generally along the first exhaust flow axis 114. In some embodiments, the first exhaust conduit 106 includes one or more bends. In such embodiments, the first exhaust flow axis 114 is defined by the direction of exhaust flow entering the PNA-SCR catalyst 104. Exhaust gas flows from the first exhaust conduit 106 to the first inlet 110, from the first inlet 110 to the first outlet 111, from the first outlet 111 to the second inlet 112, from the second inlet 112 to the second outlet 113, and from the second outlet 113 to a second exhaust conduit 116 fluidly coupled to the second outlet 113. The second exhaust conduit 116 defines a second exhaust flow axis 118. In some embodiments, the first exhaust flow axis 114 and the second exhaust flow axis 118 are nonparallel with each other. In some embodiments, the first exhaust flow axis 114 and the second exhaust flow axis 118 are perpendicular to each other. Exhaust gas flows from the PNA-SCR catalyst 104 into the second exhaust conduit 116 generally along the second exhaust flow axis 118. In some embodiments, the exhaust aftertreatment system 102 includes one or more other exhaust aftertreatment devices (not shown) operatively coupled to the second exhaust conduit 116 downstream of the PNA-SCR catalyst 104.

As explained in further detail in connection with FIG. 2, the PNA-SCR catalyst 104 also includes a substrate (not shown) positioned in the housing 108. The substrate includes a plurality of first substrate layers comprising a PNA washcoat and a plurality of second substrate layers comprising an SCR washcoat. Each of the first and second substrate layers define a plurality of flow channels. Flow channels of the first substrate layers (the PNA washcoat) are oriented along the first exhaust flow axis 114, and flow channels of the second substrate layers (the SCR washcoat) are oriented along the second exhaust flow axis 118. The first and second substrate layers are thermally coupled to each other. The PNA-SCR catalyst 104 defines a flow passage 115 fluidly coupling the first outlet 111 and the second inlet 112. The flow passage 115 is structured to cause the exhaust gas flow to change direction from the first exhaust flow axis 114 to the second exhaust flow axis 118. In some embodiments, the flow passage 115 is internal to the housing 108 of the PNA-SCR catalyst 104. In other embodiments, the flow passage 115 is external to the PNA-SCR catalyst 104.

In some embodiments, the PNA-SCR catalyst 104 includes a filter device combined with the PNA portion so as to provide both PNA and particulate filter functionality ("PNA-F"). Similarly, in some embodiments, the PNA-SCR catalyst 104 includes a filter device combined with the SCR portions so as to provide both SCR and particulate filter functionality, similar to that of an SCR on filter device. For example, in some embodiments, the flow channels of at least one of the plurality of first and second substrate layers are catalyzed particulate filter channels. In other embodiments, the PNA-SCR catalyst 104 includes a separate filter device. According to various embodiments, the separate filter device is positioned in the housing 108 upstream and/or downstream of at least one of the first and second substrate layers.

In some embodiments, the exhaust aftertreatment system 102 also includes a reductant doser 109. The reductant doser 109 is configured to controllably inject a reductant (e.g., DEF) into the exhaust gas upstream of an SCR portion of the PNA-SCR catalyst 104. In some embodiments, the reductant doser 109 is configured to controllably inject a reductant into the flow passage 115 that fluidly couples the flow channels of the first substrate with the flow channels of the second substrate. In some embodiments, the reductant doser 109 is structured to inject reductant between a PNA portion and an SCR portion, effectively "halfway" through the SCR catalyst substrate assembly. This arrangement provides faster warmup of the reductant introduction point and hence earlier reductant dosing during cold start or low temperature operation.

Although not shown in FIG. 1, it should be understood that the exhaust aftertreatment system 102 also includes a controller, one or more sensors, and one or more control elements, according to various embodiments. For example, some embodiments include at least one temperature sensor. For example, in some embodiments, temperature sensors may be positioned upstream of the PNA-SCR catalyst 104 and/or downstream of at least a portion of the PNA-SCR catalyst 104. In some embodiments, the exhaust aftertreatment system 102 includes a $NO_x$ sensor positioned upstream and/or downstream of the PNA-SCR catalyst 104.

Embodiments that include a filter element (e.g., a PNA-F, SCR on filter, or DPF) may also include a particulate sensor structured to estimate soot and ash loading on the filter element. For example, some embodiments include a pressure differential sensor or a radio frequency sensor across the filter element. Some embodiments also include various diagnostic capabilities for controlling operation of the PNA portion of the PNA-SCR catalyst 104.

It should be appreciated that the cross-flow PNA-SCR catalyst 104 may include different catalyst combinations, or more generally, aftertreatment device combinations, according to various alternative embodiments. For example, in some alternative embodiments, the exhaust aftertreatment system 102 includes a cross-flow oxidation-SCR catalyst in place of the PNA-SCR catalyst 104. In various embodiments, the cross-flow oxidation-SCR catalyst is generally structured in a similar manner as the PNA-SCR catalyst 104, except that the plurality of first substrate layers are coated with an oxidation catalyst washcoat rather than a PNA washcoat. The oxidation catalyst portion of the cross-flow oxidation-SCR catalyst is structured to oxidize exhaust constituents such as CO and HCs to form carbon dioxide ("$CO_2$") and water vapor ("$H_2O$"). Some embodiments include the reductant doser 109 configured to controllably inject reductant into the flow passage 115 downstream of the oxidation portion and upstream of the SCR portion of the cross-flow oxidation-SCR catalyst. Some embodiments further include a particulate filter positioned in the flow passage 115 downstream of the oxidation portion and upstream of the SCR portion of the cross-flow oxidation-SCR catalyst. In some embodiments, the particulate filter is positioned upstream of the reductant doser 109. In some embodiments, the plurality of second substrate layers further includes a particulate filter element.

In other alternative embodiments, the exhaust aftertreatment system 102 includes a cross-flow oxidation catalyst-particulate filter in place of the PNA-SCR catalyst 104. In various embodiments, the cross-flow oxidation catalyst-particulate filter may be generally structured in a similar manner as the PNA-SCR catalyst 104, except that the first substrate layers are coated with an oxidation catalyst washcoat rather than a PNA washcoat, and the second substrate layers include particulate filter elements rather than being coated with an SCR washcoat. The particulate filter portion of the cross-flow oxidation-SCR catalyst is structured to capture soot particles and other particulate matter in the exhaust gas. The particulate filter portion may include catalyzed filter elements so as to perform the functions of both a particulate filter and an oxidation catalyst.

Figure 2:
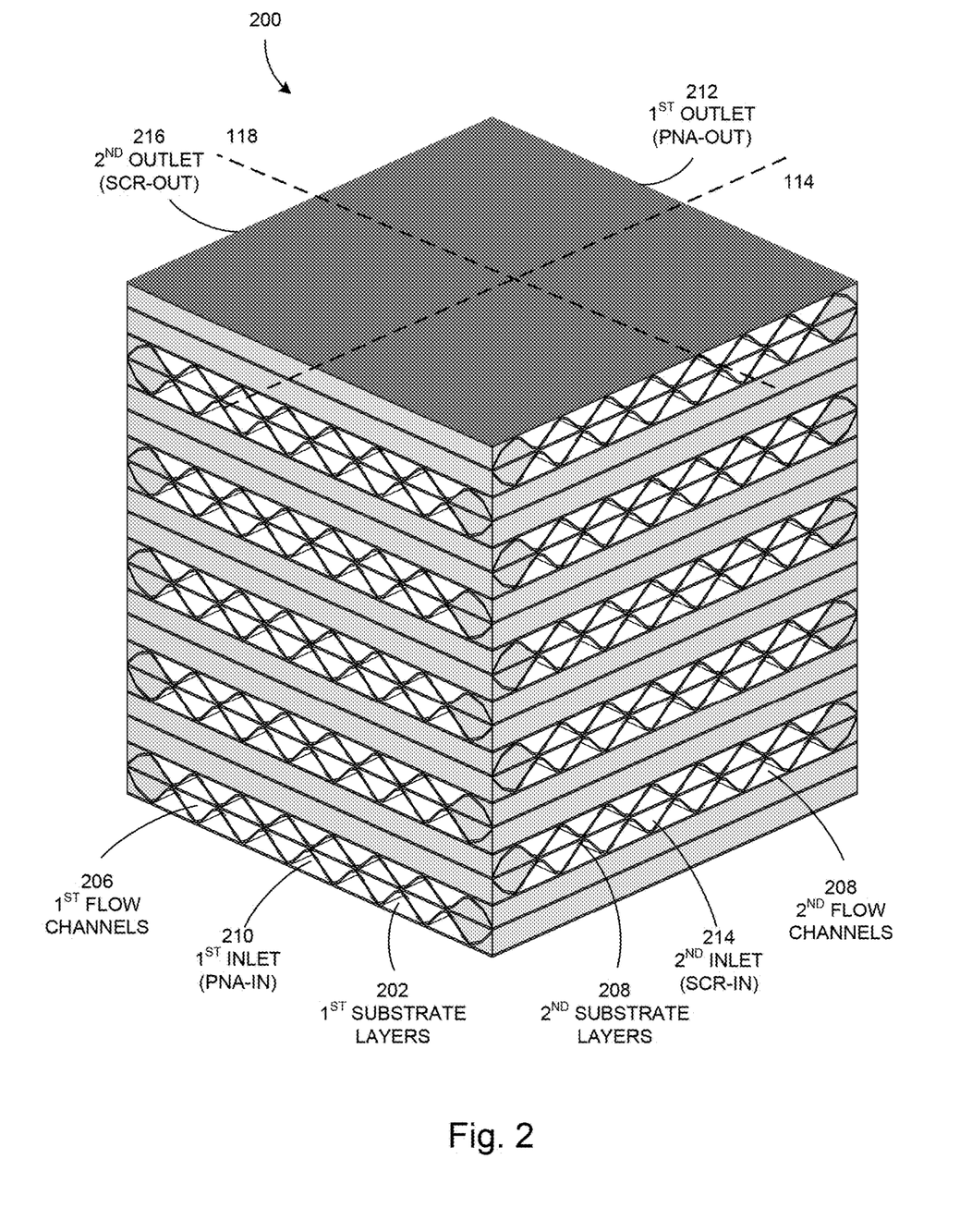
FIG. 2 is a partial cross-sectional perspective view of a PNA-SCR catalyst substrate assembly of a PNA-SCR catalyst of the exhaust aftertreatment system of FIG. 1, according to an example embodiment.

FIG. 2 is a partial cross-sectional perspective view of a PNA-SCR catalyst substrate assembly 200 of the PNA-SCR catalyst 104 of FIG. 1, according to an example embodiment. The PNA-SCR catalyst substrate assembly 200 includes a plurality of first substrate layers 202 and a plurality of second substrate layers 204. The plurality of first and second substrate layers 202, 204 are stacked in alternating order. In other words, each of the plurality of first substrate layers 202 is adjacent at least one of the plurality of second substrate layers 204 and vice-versa. The plurality of first substrate layers 202 include a PNA washcoat, and the plurality of second substrate layers 204 include an SCR washcoat.

The plurality of first substrate layers 202 are thermally coupled to the plurality of second substrate layers 204. In other words, the plurality first substrate layers 202 are structured to transfer heat to the plurality of second substrate layers 204. Therefore, heat transferred from the hot exhaust gas to the plurality of first substrate layers 202 will be quickly and efficiently transferred to the plurality of second substrate layers 204 to heat the second substrate layers 204. In contrast, existing systems that include a discrete PNA device and SCR catalyst in series inherently have a thermal gap between the two components. Therefore, existing systems exhibit a thermal lag for heating the SCR catalyst to a temperature for efficient $NO_x$ conversion (e.g., above 300° C.). In some embodiments, at least a portion of the plurality of first substrate layers 202 physically touches at least a portion of the plurality of second substrate layers 204 so as to thermally couple the pluralities of first and second substrate layers 202, 204 so as to facilitate heat transfer via conduction. In some embodiments, the pluralities of first and second substrate layers 202, 204 are thermally coupled via a thermally conductive material, such as a heat pipe.

According to various embodiments, the PNA-SCR catalyst 104 of FIG. 1, including the PNA-SCR catalyst substrate assembly 200 of FIG. 2, solves technical problems of existing aftertreatment systems by integrating the functionality of a PNA and an SCR catalyst into a single component device. The PNA portion, including the plurality of first substrate layers 202, and the SCR portion, including the plurality of second substrate layers 204 are thermally coupled to each other such that the exhaust gas flowing through the first substrate layers 202 heats the second substrate layers 204 much more quickly than in conventional systems. Therefore, the PNA-SCR catalyst 104 is able to reach efficient $NO_x$ conversion temperatures much quicker than conventional systems. Accordingly, the PNA-SCR catalyst 104 provides superior $NO_x$ conversion, and therefore lower $NO_x$ emissions, during various engine operating conditions such as engine start-up (e.g., during cold starts), low-load operation, and cold weather operation.

Each of the plurality of first and second substrate layers 202, 204 defines a plurality of first and second exhaust gas flow channels 206, 208, respectively. The first exhaust gas flow channels 206 are oriented parallel to the first exhaust flow axis 114, and the second exhaust gas flow channels 208 are oriented parallel to the second exhaust flow axis 118.

In some embodiments, the second exhaust gas flow channels 208 are structured as flow-through channels or on-wall flow channels combined with a filter device so as to provide both SCR and particulate filter functionality, similar to that of an SCR on filter device. Conversely, in other embodiments, the first exhaust gas flow channels 206 are combined with a filter device so as to provide both PNA and PNA-F functionality.

In various embodiments, configurations of the first and second exhaust gas flow channels 206, 208 are varied to optimize the tradeoff between $NO_x$ storage and reduction. For example, FIG. 2 shows the first and second exhaust gas flow channels 206, 208 of the respective PNA and SCR portions having an equal number of channels. However, in some embodiments, the PNA-SCR catalyst substrate assembly 200 includes more (e.g., twice as many) of the first exhaust gas flow channels 206 (the PNA channels) than the second exhaust gas flow channels 208 (the SCR channels) to favor $NO_x$ storage capacity over $NO_x$ conversion capacity. That is, instead of having a 1:1 channel ratio between the first and second exhaust gas flow channels 206, 208, the ratio could be generalized to M:N, where M is number of PNA channels and N is the number of SCR channels. This same concept could similarly be applied if the second exhaust gas flow channels 208 were SCR on filter channels. Further, in some embodiments, the cross-sections of the first exhaust gas flow channels 206 are different than the cross-sections of the second exhaust gas flow channels 208. For example, in some embodiments, the first exhaust flow channels 206 have a first cross-sectional area and the second exhaust flow channels 208 have a second cross-sectional area different than the first cross-sectional area. In some embodiments, the first exhaust flow channels 206 have a first cross-sectional shape and the second exhaust flow channels 208 have a second cross-sectional shape different than the first cross-sectional shape. For example, in one embodiment, one of the first and second exhaust gas flow channels 206, 208 utilizes square cross-sections and the other utilizes hexagonal cross-sections.

The PNA-SCR catalyst substrate assembly 200 defines a first inlet 210, a first outlet 212, a second inlet 214, and a second outlet 216. The first inlet 210 is in fluid communication with the first inlet 110 of the PNA-SCR catalyst 104.

Similarly, the first outlet 212 is in fluid communication with the first outlet 111, the second inlet 214 is in fluid communication with the second inlet 112, and the second outlet 216 is in fluid communication with the second outlet 113. In operation, exhaust gas flows along the first exhaust flow axis 114 into the first inlet 210, through the plurality of first exhaust gas flow channels 206, and out of the first outlet 212. Because the plurality of first exhaust gas flow channels 206 have a PNA washcoat, the first inlet 210 is an inlet of a PNA portion of the PNA-SCR catalyst substrate assembly 200, and the first outlet 212 is an outlet of the PNA portion of the PNA-SCR catalyst substrate assembly 200.

The exhaust gas flows from the first outlet 212 to the second inlet 214. The exhaust gas is injected with a reductant (e.g., via the reductant doser 109) as it flows between the first outlet 212 and the second inlet 214. In various embodiments, the reductant is injected into the exhaust gas downstream of the PNA portion because platinum group metal ("PGM") loading on the PNA portion would convert $NH_3$ in the reductant into $NO_x$.

The exhaust gas then flows along the second exhaust flow axis 118 from the second inlet 214, through the plurality of second exhaust gas flow channels 208, and out of the second outlet 216. Because the plurality of second exhaust gas flow channels 208 have an SCR washcoat, the second inlet 214 is an inlet of a SCR portion of the PNA-SCR catalyst substrate assembly 200, and the second outlet 216 is an outlet of the SCR portion of the PNA-SCR catalyst substrate assembly 200.

In various embodiments, the ability of the PNA-SCR catalyst 104 to convert all of the $NO_x$ during a cold start depends on the ability of the PNA portion of the PNA-SCR catalyst substrate assembly 200 to store all engine-out $NO_x$ emitted prior to the SCR portion of the PNA-SCR catalyst substrate assembly 200 reaching a threshold temperature for DEF dosing and effective $NO_x$ conversion. Some embodiments favor lower engine-out $NO_x$ and higher engine-out temperatures during cold start, combined with the PNA-SCR catalyst substrate assembly 200 being large enough to hold all cold start $NO_x$ but not so large as to excessively slow down the SCR catalyst warmup time. In some embodiments, the PNA-SCR catalyst 104 is capable of attaining 0.02 g/hp-hr system out $NO_x$ or theoretically as low as 0.00 g/hp-hr $NO_x$.

This PNA-SCR catalyst 104 is also useful for applications with persistent low exhaust temperatures (such as low load operation). As with cold start applications, the PNA portion of the PNA-SCR catalyst substrate assembly 200 is structured to store $NO_x$ during low temperature operation and to release and convert $NO_x$ across the SCR portion when the exhaust gas warms up.

In either cold start or low load, low temperature scenarios, the PNA-SCR catalyst 104 is most effective in a position closely coupled to the engine 100 because this exposes the PNA-SCR catalyst 104 to warm exhaust gas sooner than in a position further from the engine 100, such as an underfloor position. Consequently, PNA-SCR catalyst substrate assembly 200 of the closely coupled PNA-SCR catalyst 104 requires less PNA $NO_x$ storage capacity because the PNA-SCR catalyst substrate assembly 200 would spend less time in a low temperature state. If the periods of low temperature operation are too long to be covered by the amount of available PNA $NO_x$ storage, then engine thermal management can be applied to periodically desorb PNA-stored $NO_x$ for conversion across the SCR portion of the PNA-SCR catalyst substrate assembly 200. In some embodiments, such as applications having frequent cold start requirements, the PNA-SCR catalyst 104 is positioned as a first catalyst element following the turbo outlet in either an underfloor or closely coupled position.

In an example embodiment, the PNA-SCR catalyst substrate assembly 200 is structured to maintain the plurality of first and second substrate layers 202, 204 (the PNA and SCR portions) at about the same temperature. Therefore, the thermal conductivity of the first and second substrate layers 202, 204 is sufficiently high so as to minimize a temperature differential between the plurality of first and second substrate layers 202, 204. In some example embodiments, the PNA portion of the PNA-SCR catalyst substrate assembly 200 is tuned so that its $NO_x$ release temperature window coincides with the temperatures needed for optimal $NO_x$ conversion. In these embodiments, any temperature at which the PNA portion releases $NO_x$ also results in the SCR portion being at temperatures high enough to reduce the released $NO_x$.

The PNA-SCR catalyst 104 including the PNA-SCR catalyst substrate assembly 200 provides various advantages over typical exhaust aftertreatment systems. For example, the PNA-SCR catalyst 104 damps out temperature fluctuations of the SCR/SCR on filter and the PNA/PNA-F portions during transient events (described further below in connection with FIGS. 6A and 6B). A more consistent SCR catalyst temperature, for example, makes reductant dosing easier to manage. This reduces the magnitude of $NH_3$ desorb events that occur with temperature increases. The consistent SCR catalyst temperature also maintains the SCR portion in a predictable "sweet spot" for optimal $NO_x$ conversion. In embodiments that include an SCR on filter or PNA-F portion, consistent temperature of that portion makes soot regeneration easier to control. This reduces risk of uncontrolled soot regeneration events.

The structure of the PNA-SCR catalyst 104 also facilitates faster cool down of components. For example, heat is transferred from the SCR/SCR on filter portion to the PNA portion to cool the SCR/SCR on filter portion.

The PNA-F variant of the PNA-SCR catalyst 104 avoids competition for $NO_2$ between SCR reaction and soot regeneration performed by an SCR on filter portion. This is because soot would be trapped on the first exhaust gas flow channels 206 (the PNA channels) and would not reach the downstream second exhaust gas flow channels 208 (the SCR channels).

The PNA portion of the PNA-SCR catalyst 104 also functions as a DOC at higher temperatures. Therefore, the PNA portion can be used to generate heat for improved SCR $NO_x$ conversion and/or soot regeneration events on an SCR on filter portion. When the PNA portion functions as a DOC (at higher temperatures), transfer of heat made by HC dosing to the filter features of the SCR on filter is more effective because the PNA and SCR on filter portions are in direct contact through the PNA-SCR catalyst substrate assembly 200. This would not have as much external heat loss between the DOC and filter as in current systems and would therefore save on fuel for HC dosing. Accordingly, the PNA-SCR catalyst 104 provides a more effective use of heat (e.g., fuel) between the PNA portion and the SCR on filter portion.

The PNA portion of the PNA-SCR catalyst 104 also stores sulfur, thereby necessitating periodic high temperature desulfation ("$deSO_x$") events. These thermal events could be simultaneously used for SCR on filter soot regeneration. Conversely, heat generated from burning soot would aid in $deSO_x$ of the PNA portion.

According to various alternative embodiments, the exhaust aftertreatment system 102 (FIG. 1) includes a crossflow oxidation-SCR catalyst in place of the PNA-SCR catalyst 104. In such embodiments, the plurality of first substrate layers 202 are coated with an oxidation catalyst washcoat rather than a PNA washcoat. The plurality of second substrate layers 204 are coated with an SCR washcoat.

In other alternative embodiments, the exhaust aftertreatment system 102 includes a cross-flow oxidation catalyst-particulate filter in place of the PNA-SCR catalyst 104. In such embodiments, the plurality of first substrate layers 202 are coated with an oxidation catalyst washcoat rather than a PNA washcoat. The plurality of second substrate layers 204 include particulate filter elements rather than being coated with an SCR washcoat.

Figure 3:
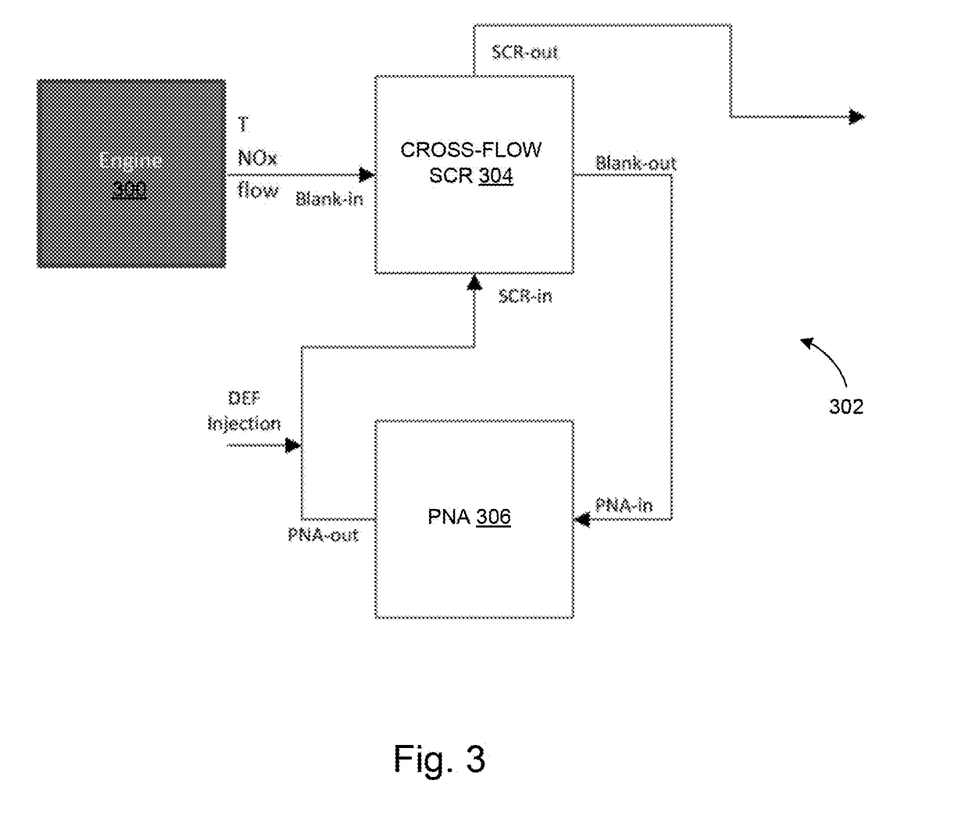
FIGS. 3-5 are block diagrams illustrating an engine and an exhaust aftertreatment system fluidly coupled to the engine, according to various alternative embodiments.

FIG. 3 is a block diagram illustrating an engine 300 and an exhaust aftertreatment system 302 fluidly coupled to an exhaust manifold (not shown) of the engine 300, according to an alternative embodiment. The exhaust aftertreatment system 302 includes a cross-flow SCR catalyst 304 and a PNA 306 positioned downstream of the cross-flow SCR catalyst 304. The cross-flow SCR catalyst 304 is generally similar to the PNA-SCR catalyst 104 of FIG. 1, including the PNA-SCR catalyst substrate assembly 200 of FIG. 2, except that the PNA layers (the plurality of first substrate layers 202) are replaced with uncoated substrate. This has the same effect of pre-heating the SCR layers of the cross-flow SCR catalyst 304 without exposing the SCR layers to the exhaust gas. The PNA 306 is included as a separate downstream element. This configuration would result in the PNA substrate of the PNA 306 being colder than the SCR substrate of the cross-flow SCR catalyst 304 during warm-up. This effectively provides a negative thermal lag, which would be beneficial for both devices. In operation, the PNA 306 continues to store $NO_x$ under cold conditions, and the cross-flow SCR catalyst 304 would be warmer than the PNA 306 when the PNA 306 begins to release $NO_x$. This could enable the $NO_x$ release window of the PNA 306 to be shifted to lower temperatures.

In operation, the engine 300 releases exhaust gas containing $NO_x$, which flows to the cross-flow SCR catalyst 304. The exhaust gas is not processed by the cross-flow SCR catalyst 304 but rather pre-heats the cross-flow SCR catalyst 304. The exhaust exits the cross-flow SCR catalyst 304 and flows to the PNA 306. The exhaust flows through the channels of the PNA 306, exits the PNA 306, and is injected with reductant. The exhaust re-enters the cross-flow SCR catalyst 304 and is then processed by the cross-flow SCR catalyst 304. The exhaust exits the cross-flow SCR catalyst 304 and is expelled to the ambient environment or is processed by further downstream aftertreatment components.

Figure 4:
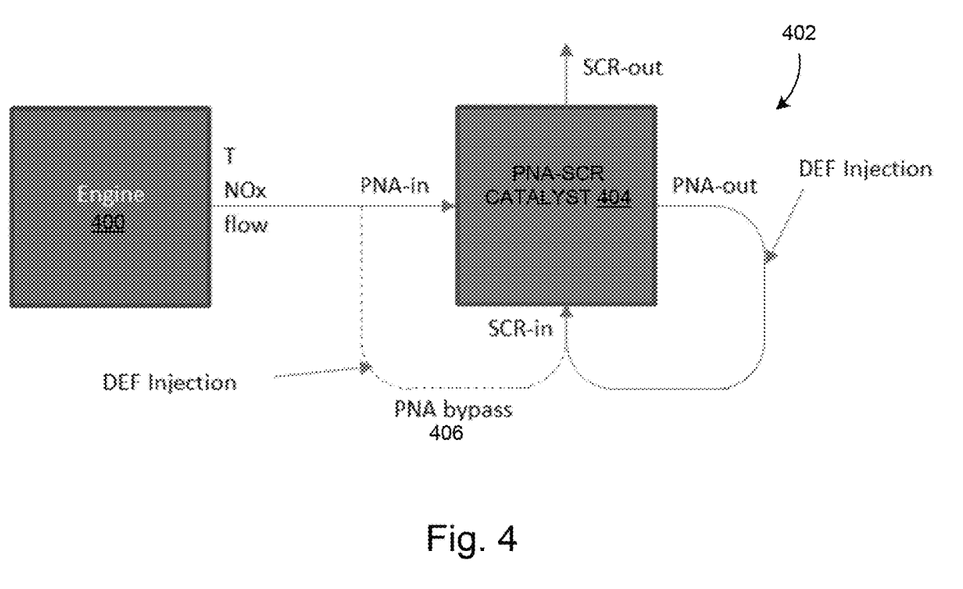

FIG. 4 is a block diagram illustrating an engine 400 and an exhaust aftertreatment system 402 fluidly coupled to an exhaust manifold (not shown) of the engine 400, according to another alternative embodiment. The exhaust aftertreatment system 302 includes a PNA-SCR catalyst 404 in fluid receiving communication with the engine 400. In some embodiments, the PNA-SCR catalyst 404 is generally similar to the PNA-SCR catalyst 104 of FIG. 1 including the PNA-SCR catalyst substrate assembly 200 of FIG. 2.

The exhaust aftertreatment system 402 also includes a PNA bypass leg 406 structured to controllably divert exhaust gas past the PNA portion of the PNA-SCR catalyst 404 during normal, warm operation (e.g., when the exhaust gas temperature is above a threshold temperature). Thus, the PNA portion of the PNA-SCR catalyst 404 would only be used during cold start or low temperature operation. The PNA bypass leg 406 can be utilized with any configuration of the PNA-SCR catalyst 404, including configurations that include a PNA-F or SCR on filter device. It should be understood that the exhaust aftertreatment system 402 may also include an active or passive control valve structured to controllably divert exhaust gas into the PNA bypass leg 406.

Figure 5:
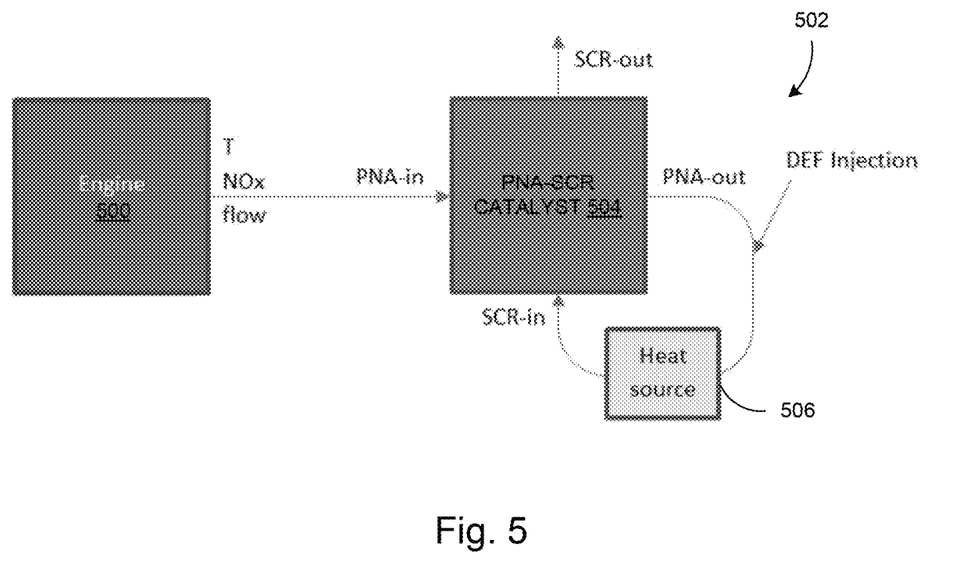

FIG. 5 is a block diagram illustrating an engine 500 and an exhaust aftertreatment system 502 fluidly coupled to an exhaust manifold (not shown) of the engine 500, according to another alternative embodiment. The exhaust aftertreatment system 502 includes a PNA-SCR catalyst 504 in fluid receiving communication with the engine 500. In some embodiments, the PNA-SCR catalyst 504 is generally similar to the PNA-SCR catalyst 104 of FIG. 1 including the PNA-SCR catalyst substrate assembly 200 of FIG. 2.

The exhaust aftertreatment system 502 also includes an external heat source 506 (e.g. electric exhaust heater) in a flow path between the PNA and SCR portions of the PNA-SCR catalyst 504. The external heat source 506 is structured to controllably heat the exhaust gas downstream of the PNA portion and upstream of the SCR portion. The external heat source 506 enables SCR temperature control for conditions where the engine-out exhaust temperature is not warm enough for sufficiently long periods of time required for effective PNA desorption and SCR conversion. The external heat source 506 also helps the exhaust gas reach reductant dosing temperatures sooner, helps remove any reductant deposits, helps the exhaust gas reach PNA desulfation temperatures, and/or helps the exhaust gas reach soot regeneration temperatures for PNA-F or SCR on filter architectures. It should be understood that the external heat source 506 of FIG. 5 can be utilized in connection with any of the exhaust aftertreatment systems 102, 302, 402, and 502 of FIGS. 1 and 3-5. Some embodiments also include a temperature sensor downstream of the external heat source 506. In some embodiments, the external heat source 506 is controlled based on temperature measurement signals received from the temperature sensor.

Figure 6A:
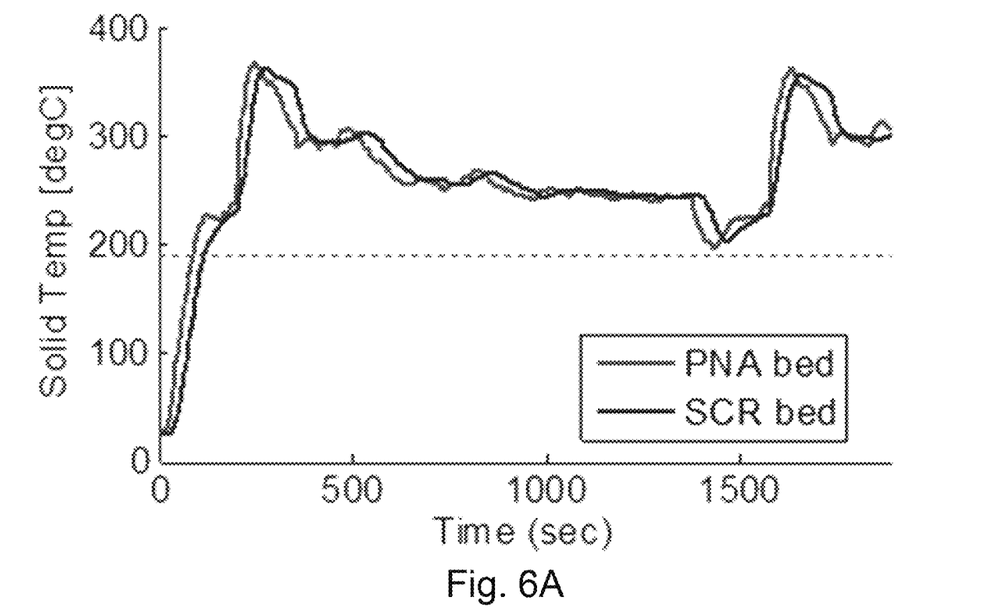
FIG. 6A is a graph illustrating PNA and SCR catalyst temperatures during a test cycle, where the PNA and the SCR catalysts are sequential and separate catalyst elements.
Figure 6B:
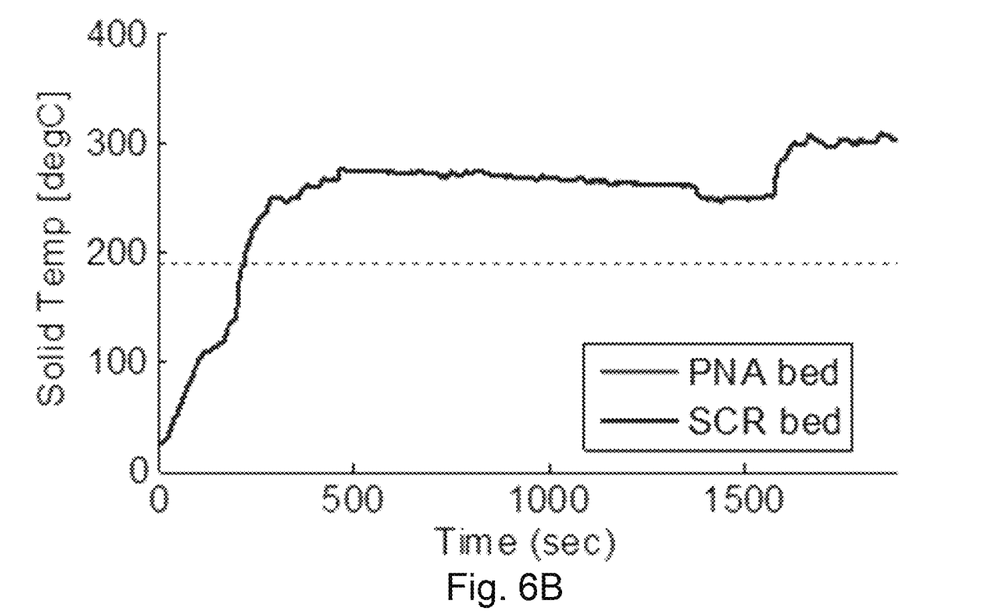
FIG. 6B is a graph illustrating PNA and SCR catalyst temperatures during a test cycle, where the PNA and the SCR catalyst portions are on different flow paths of a single crossflow PNA-SCR catalyst, according to an example embodiment.

FIG. 6A is a graph illustrating PNA and SCR catalyst temperatures during an FTP75 cycle, where the PNA and the SCR catalyst are sequential and separate catalyst elements. FIG. 6B is a graph illustrating PNA and SCR catalyst temperatures during the FTP75 cycle, where the PNA and SCR catalyst portions are on different flow paths of single crossflow PNA-SCR catalyst, according to an example embodiment. In other words, FIG. 6B represents temperatures of the PNA-SCR catalysts 104, 404, 504 of FIGS. 1, 4, and 5. As shown in FIG. 6A, temperatures of the SCR catalyst lag those of the separate PNA. However, as shown in FIG. 6B, temperatures of the PNA and SCR portions of the PNA-SCR cross-flow catalyst are effectively the same. The ability of the PNA-SCR crossflow catalyst to hold the PNA and SCR portions at the same temperature was demonstrated using a 1D simulation in AVL BOOST. The thermal behavior of various aftertreatment systems was modeled using an FTP75 cycle input.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "in one embodiment," "in an embodiment," "in an example embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An exhaust aftertreatment system, comprising:
 a cross-flow selective catalytic reduction catalyst, comprising:
  a housing defining a first inlet in exhaust gas receiving communication with an engine, and
  a substrate assembly positioned within the housing, the substrate assembly comprising:
   a plurality of first substrate layers defining a plurality of first flow channels, the plurality of first substrate layers being uncoated, and
   a plurality of second substrate layers defining a plurality of second flow channels, the plurality of second substrate layers comprising a selective catalytic reduction washcoat; and
 a passive $NO_x$ adsorber, comprising:
  a housing, comprising:
   an inlet in exhaust gas receiving communication with the plurality of first flow channels of the cross-flow selective catalytic reduction catalyst, and
   an outlet in exhaust gas providing communication with the plurality of second flow channels of the cross-flow selective catalytic reduction catalyst, and
  a substrate positioned in the housing, the substrate comprising a passive $NO_x$ adsorber washcoat.

2. The exhaust aftertreatment system of claim 1, wherein:
 the housing of the cross-flow selective catalytic reduction catalyst further comprises a first outlet, a second inlet, and a second outlet,
 the plurality of first flow channels extend along a first exhaust flow axis between the first inlet and the first outlet, and
 the plurality of second flow channels extend along a second exhaust flow axis between the second inlet and the second outlet, the first exhaust flow axis being nonparallel with the second exhaust flow axis.

3. The exhaust aftertreatment system of claim 2, wherein the first exhaust flow axis is perpendicular to the second exhaust flow axis.

4. The exhaust aftertreatment system of claim 2, further comprising a reductant doser positioned between the outlet of the passive $NO_x$ adsorber and the second inlet of the housing of the cross-flow selective catalytic reduction catalyst, the reductant doser structured to controllably inject a reductant into exhaust gas upstream of the plurality of second flow channels of the cross-flow selective catalytic reduction catalyst.

5. The exhaust aftertreatment system of claim 2, wherein the plurality of second substrate layers are thermally coupled with the plurality of first substrate layers.

6. The exhaust aftertreatment system of claim 5, wherein exhaust gas flowing through the plurality of first flow channels is structured to pre-heat the plurality of second substrate layers.

7. The exhaust aftertreatment system of claim 1, wherein the plurality of first substrate layers and the plurality of second substrate layers are layered in alternating order.

8. The exhaust aftertreatment system of claim 1, wherein at least one of the plurality of first substrate layers and the plurality of second substrate layers further comprises a particulate filter.

9. The exhaust aftertreatment system of claim 8, wherein the particulate filter comprises particulate filter channels defined by the plurality of first substrate layers.

10. The exhaust aftertreatment system of claim 9, wherein the particulate filter comprises particulate filter channels defined by the plurality of second substrate layers.

11. The exhaust aftertreatment system of claim 1, wherein a ratio of a number of the plurality of first substrate layers and a number of the plurality of second substrate layers is M:N, where M>N.

12. The exhaust aftertreatment system of claim 1, further comprising a connecting passage in fluid receiving communication with the plurality of first substrate layers and in fluid providing communication with the plurality of second substrate layers.

13. The exhaust aftertreatment system of claim 1, wherein the passive $NO_x$ adsorber is positioned fluidly downstream of the cross-flow selective catalytic reduction catalyst.

14. The exhaust aftertreatment system of claim 1, wherein the exhaust gas is structured to pre-heat the cross-flow selective catalytic reduction catalyst.

15. The exhaust aftertreatment system of claim 1, wherein the plurality of first substrate layers define a first flow direction, and the plurality of second substrate layers define a second flow direction perpendicular to the first flow direction.

* * * * *